Patented June 16, 1942

2,286,963

UNITED STATES PATENT OFFICE 2,286,963

PUNCTURE SEALING COMPOSITION

Lloyd R. Houser and Richard W. Evans, Washington, D. C., assignors to Capital Tire and Safety Co., Inc., Newport News, Va., a corporation of Delaware No Drawing. Application March 27, 1942, Serial No. 436,528

7 Claims. (Cl. 106—33)

The present invention relates to a novel puncture sealing composition and a method for the preparation thereof.

Many compositions adapted to fill small holes or fissures in pneumatic tires and prevent the escape of air from the tire are well known. In general these may consist of various suspending or fluid mediums and various types of fillers. In actual practice however, many of these compositions have proven unsatisfactory for the purpose intended. Thus, the substances used in many instances have been injurious to the material of the tire or inner tube. In some instances a good seal was not produced and in others the seal did not remain effective when the tire was in actual use at relatively high speeds. Still others of the compounds previously known, did not remain in a homogeneous state during storage or during use, i. e., the fillers and suspending medium tended to separate.

The discovery has been made, however, that if a suitable, carefully prepared solution or suspension of starch, in a suitably gelatinized condition, is compounded with a suitable suspension or solution of gelatin, both of these ingredients being suspended or dissolved in water, the resultant suspension or solution functions advantageously as a base suspending medium for suitable fibrous media and/or fillers. The present composition consists essentially of a mixture, which may be considered a suspension, of the consistency of a rather thin paste or thick liquid, said mixture including in addition to the base suspending medium of starch and gelatin; of a fibrous filler, preferably asbestos; an earthy or clay-like filler, preferably fuller's earth; an antifreeze ingredient, preferably calcium chloride; and a preservative, preferably cresol.

Other fibrous fillers may be used in place of the asbestos, such as shredded or defibrated wood pulp, pulverized rock wool, glass wool, cotton linters, etc. Preferably the asbestos or other fibrous materials are used in a plurality of sizes. Advantageously, asbestos fiber No. 296 and asbestos fiber No. 211 are used in combination, asbestos fiber No. 296, consisting of fibers from ¼" in length to powder and asbestos fiber No. 211 being substantially finer.

Although fuller's earth has been found to be especially desirable for use in the present composition, other clay-like or earthy fillers may be used as for example: bentonite, kaolin or china clay.

It is within the broader aspects of the present invention to utilize almost any anti-freeze ingredient which will be compatible with the other ingredients of the composition and will not harm the tire, tube or casing. These may be liquids such as lower alcohols or a polybasic alcohol such as glycerine. Preferably, however, the antifreeze component of the composition is a neutral inorganic salt such as calcium chloride. Other salts such as magnesium chloride or sodium chloride, however, may be used, and in general all of the neutral water-soluble salts of the alkali and alkali earth metals.

As a preservative agent cresol has been found to be most advantageous. However, other chemically similar preservative and antiseptic agents such as resorcinol and phenol may be used as well as antiseptic and preservative agents, such as pine tar or turpentine.

Preferably the present composition is composed specifically of the following ingredients:

| | Per cent by weight (Approximate) |
|---|---|
| Water | 70.0 |
| Fuller's earth | 6.0 |
| Calcium chloride | 5.5 |
| Asbestos fibers | 12.0 |
| Gelatin | 3.0 |
| Starch | 2.5 |
| Cresol | 1.0 |

The composition is preferably compounded with the aid of four vats which, for the sake of convenience in explanation, will be designated A, B, C and D. Vats A and B may be of ten gallon capacity while vats C and D are of four gallon capacity with vats C and D fitted with heaters which may be controlled critically, as explained below.

For the purpose of obtaining a batch of approximately nine and three-quarters gallons of the composition, one and a half gallons of water at normal temperature, is poured into each of vats A and B, to which water is added three pounds of calcium chloride crystals which are dissolved thoroughly in the water by stirring and which will produce a reaction which will cause the temperature of the water to rise to approximately 95° to 100° F. The solution in each of the tanks A and B is permitted to cool to room temperature, whereupon two and three-quarters pounds of fuller's earth is added to the solution in each of vats A and B. Thereafter three and one-quarter pounds of asbestos fiber No. 296 and two and three-quarters pounds of asbestos fiber No. 211 are added to each of the tanks, preferably through screens, which is kneaded into the solutions in each of the tanks.

In the meantime, vats C and D have been each filled with two and three-quarters gallons of water under normal temperature. Three pounds of granulated gelatin are dissolved by stirring the same when the water is cold in vat C, while two and a half pounds of starch (A grade) are incorporated into the two and three-quarters gallons of water in vat D at its normal temperature. Thereupon the contents of vat C are carefully heated at a rate so that the same reaches a temperature of approximately 195° F. in forty-five minutes, while the contents of vat D are heated within the same time, or within a latitude of five minutes to bring the starch to its thickening or gelatinizing stage, which in no case should reach the boiling point of the composition.

Thereafter one-half of the contents of the vat C is poured into each of the vats A and B, followed by the pouring of one-half the contents of vat D into each of vats A and B. This introduction of the gelatin followed by the starch solution in each of the vats A and B, is followed by a thorough mixing of the ingredients in the vats A and B with stirrers, paddles or kneading, for about fifteen or twenty minutes and thereafter the compositions in each of the vats are allowed to cool for one hour. After this time, seven ounces of commercial cresol solution is added to each one of the vats A and B. The final mixing operation comprehends the intimate mixture of the contents A and B which are identical and which are divided primarily to give a more uniform product. This final mix can take place for fifteen or twenty minutes in either one of the vats A or B, whereupon the composition is allowed to stand uncovered over night or approximately twelve hours to permit the resulting gases to pass off.

The resulting composition is of the consistency of catsup and has a deep gray color.

The above process may be simplified by using a single vat in place of vats A and B in which is mixed about six pounds of calcium chloride and about five and a half pounds of fuller's earth in about three gallons of water and into which is incorporated approximately twelve pounds of mixed asbestos fibers as set forth above. The contents of vat C, namely the gelatin composition, are added to the mixture above, followed by the contents of vat D, namely the starch composition, great care being taken to thoroughly mix the various materials of the mixture to a homogeneous state in view of the combined procedure. The cooling and final addition of the preservative agent are carried out in the same manner as outlined above.

Although in the foregoing example the gelatin solution is stated to be heated to a temperature of 195° F. and this temperature is preferable, it may be slightly exceeded with somewhat less advantageous results and in general it may be stated that the gelatin solution should be slowly heated to a temperature of approximately from 195° F. to 205° F. or close to but substantially below the boiling point thereof, and similar temperature limitations should be observed in the heating of the starch solution.

We claim:

1. The method of preparing a puncture sealing composition comprising forming an aqueous anti-freeze solution, adding thereto a fibrous filler and an earthy filler, separately preparing a suspension of gelatin by heating a mixture of gelatin and water to a temperature of approximately 195° to 205° F., separately preparing a suspension of starch in gelatinous thickened condition by mixing starch and water, adding the suspension of gelatin to the aqueous mixture of anti-freeze solution and fibrous and earthy fillers, thereafter adding the suspension of starch to the mixture, and finally adding a preservative agent to the mass.

2. The method of preparing a puncture sealing composition comprising dissolving a neutral water soluble salt of an alkaline earth metal in water, adding thereto a fibrous filler and a clayey filler, separately preparing a suspension of gelatin by heating a mixture of gelatin and water to a temperature of approximately 195° to 205° F., separately preparing a suspension of starch in gelatinous thickened condition by heating a mixture of starch and water, adding the suspension of gelatin to the aqueous mixture of anti-freeze solution and fibrous and clay-like fillers, thereafter adding the suspension of starch to the mixture, and finally adding a preservative agent to the mass.

3. A method for the preparation of a puncture sealing composition comprising forming a solution of calcium chloride in water, adding thereto asbestos fiber and fuller's earth in finely divided form, separately preparing a suspension of gelatin by heating a mixture of gelatin and water to a temperature of approximately 195° to 205° F., separately preparing a suspension of starch in gelatinous, thickened condition by heating a mixture of starch and water, adding the suspension of gelatin to the water, asbestos fiber and fuller's earth mixture, thereafter adding the suspension of starch to the mixture and finally adding a preservative agent.

4. A method for the preparation of a puncture sealing composition comprising forming a solution of approximately six parts of calcium chloride in twenty-four parts of water, adding thereto approximately twelve parts of asbestos fiber and six parts of fuller's earth in finely divided form, separately preparing a suspension of gelatin by heating a mixture of approximately three parts of gelatin and twenty-two and a half parts of water to a temperature of approximately 195° to 205° F., separately preparing a suspension of starch in gelatinous, thickened condition by heating a mixture of approximately three parts of starch and twenty-two and a half parts of water, adding the suspension of gelatin to the water, asbestos fiber and fuller's earth mixture, thereafter adding the suspension of starch to the mixture and finally adding approximately one part of cresol thereto.

5. A method for the preparation of a puncture sealing composition comprising forming two batches of solution, each consisting of approximately three parts of calcium chloride dissolved in twelve parts of water, adding to each batch approximately six parts of asbestos fiber of different fineness and three parts of fuller's earth in finely divided form, separately preparing a suspension of gelatin by heating a mixture of approximately three parts of gelatin and twenty-two and a half parts of water to a temperature of approximately 195° to 205° F., separately preparing a suspension of starch in gelatinous, thickened condition by heating a mixture of three parts of starch and twenty-two and a half parts of water, adding one-half of the suspension of gelatin to each batch of the water, asbestos fiber and fuller's earth mixture, thereafter adding one-half of the suspension of starch to each of the batch mixtures and mixing thoroughly, adding one-half part of a preservative agent to each of the batches, and finally combining the two batch mixtures accompanied by mixing.

6. A puncture sealing composition consisting of a homogeneous suspension, having a thick liquid consistency, of a base suspending medium of starch and gelatin in water, a fibrous filler, an earthy filler, an anti-freeze component and a preservative agent.

7. A puncture sealing composition consisting of a homogeneous suspension, having a thick liquid consistency, of approximately 70 parts of water, 3 parts of gelatin, 2.5 parts of starch, 12 parts of asbestos fibers, 6 parts of fuller's earth, 5.5 parts of calcium chloride and 1 part of cresol.

LLOYD R. HOUSER.
RICHARD W. EVANS.